US011633983B2

(12) United States Patent
Brivio et al.

(10) Patent No.: US 11,633,983 B2
(45) Date of Patent: Apr. 25, 2023

(54) TYRE FOR BICYCLE WHEELS

(71) Applicant: PIRELLI TYRE S.p.A., Milan (IT)

(72) Inventors: Paolo Brivio, Milan (IT); Fabio Meni, Milan (IT); Luca Giannini, Milan (IT); Luciano Tadiello, Milan (IT); Pierangelo Misani, Milan (IT)

(73) Assignee: PIRELLI TYRE S.p.A., Milan (IT)

( * ) Notice: Subject to any disclaimer, the term of this patent is extended or adjusted under 35 U.S.C. 154(b) by 509 days.

(21) Appl. No.: 16/608,561

(22) PCT Filed: May 4, 2018

(86) PCT No.: PCT/IB2018/053124
§ 371 (c)(1),
(2) Date: Oct. 25, 2019

(87) PCT Pub. No.: WO2018/207068
PCT Pub. Date: Nov. 15, 2018

(65) Prior Publication Data
US 2020/0180359 A1 Jun. 11, 2020

(30) Foreign Application Priority Data
May 8, 2017 (IT) .................. 102017000049520

(51) Int. Cl.
| | |
|---|---|
| *B60C 1/00* | (2006.01) |
| *C08K 3/013* | (2018.01) |
| *C08K 3/04* | (2006.01) |
| *C08K 3/36* | (2006.01) |
| *C08K 7/10* | (2006.01) |
| *C08K 9/02* | (2006.01) |
| *C08K 9/04* | (2006.01) |
| *C08L 1/02* | (2006.01) |
| *C08L 33/08* | (2006.01) |
| *C08L 47/00* | (2006.01) |
| *C08L 67/00* | (2006.01) |
| *C08L 77/00* | (2006.01) |
| *B82Y 30/00* | (2011.01) |
| *B82Y 40/00* | (2011.01) |

(52) U.S. Cl.
CPC ............ *B60C 1/0016* (2013.01); *C08K 3/013* (2018.01); *C08K 3/04* (2013.01); *C08K 3/36* (2013.01); *C08K 7/10* (2013.01); *C08K 9/02* (2013.01); *C08K 9/04* (2013.01); *C08L 1/02* (2013.01); *C08L 33/08* (2013.01); *C08L 47/00* (2013.01); *C08L 67/00* (2013.01); *C08L 77/00* (2013.01); *B60C 2200/12* (2013.01); *B82Y 30/00* (2013.01); *B82Y 40/00* (2013.01); *C08K 2201/003* (2013.01); *C08K 2201/004* (2013.01); *C08K 2201/006* (2013.01); *C08K 2201/016* (2013.01); *C08L 2312/00* (2013.01)

(58) Field of Classification Search
CPC ... C08K 9/02; C08K 7/10; C08K 3/04; C08K 9/04; C08K 3/36; C08K 3/013; C08K 7/02; C08K 2201/004; C08K 2201/011; C08K 2201/016; C08K 2201/006; C08K 2201/003; C08L 67/00; C08L 21/00; C08L 77/00; C08L 33/08; C08L 47/00; C08L 1/02; C08L 9/00; C08L 7/00; C08L 2312/00; B60C 1/0016; B60C 2200/12; B82Y 30/00; B82Y 40/00
See application file for complete search history.

(56) References Cited

U.S. PATENT DOCUMENTS

| | | |
|---|---|---|
| 3,006,899 A | 10/1961 | Hill et al. |
| 3,063,966 A | 11/1962 | Kwolek et al. |
| 3,094,511 A | 6/1963 | Hill, Jr. et al. |
| 3,287,323 A | 11/1966 | Kwolek et al. |
| 3,322,728 A | 5/1967 | Hill, Jr. et al. |
| 3,349,062 A | 10/1967 | Hill et al. |
| 3,354,127 A | 11/1967 | Hill, Jr. et al. |
| 3,380,969 A | 4/1968 | Hill, Jr. et al. |
| 3,671,542 A | 6/1972 | Kwolek |
| 3,951,914 A | 4/1976 | Kwolek |
| 4,871,004 A | 10/1989 | Brown et al. |
| 5,006,603 A | 4/1991 | Takaki et al. |
| 5,049,610 A | 9/1991 | Takaki et al. |
| 8,474,499 B2 | 7/2013 | Tuffile et al. |
| 8,833,416 B2 | 9/2014 | Bestgen et al. |
| 9,016,341 B2 | 4/2015 | Klapp et al. |

(Continued)

FOREIGN PATENT DOCUMENTS

| | | | |
|---|---|---|---|
| EP | 0 329 589 A2 | 8/1989 | |
| EP | 0756949 A1 | * | 2/1997 |

(Continued)

OTHER PUBLICATIONS

International Search Report form the European Patent Office in corresponding International Application No. PCT/IB2018/053124 dated Jul. 11, 2018.

(Continued)

*Primary Examiner* — Angela C Scott
(74) *Attorney, Agent, or Firm* — Finnegan, Henderson, Farabow, Garrett & Dunner, L.L.P.

(57) ABSTRACT

The present invention refers to a tyre for bicycle wheels comprising a tread band containing an anti-puncture system capable of having high resistance to the penetration of foreign bodies, simultaneously ensuring optimal handling performances. In particular the present invention regards a tyre for bicycle wheels comprising: a carcass structure; and—a tread band arranged in radially outer position with respect to the carcass structure; wherein said tread band is made by means of vulcanisation of a cross-linkable elastomeric composition comprising a reinforcement system constituted by modified silicate fibres of nanometric size and fibrillated polymer fibres of micrometric size.

20 Claims, 5 Drawing Sheets

(56) References Cited

U.S. PATENT DOCUMENTS

| | | |
|---|---|---|
| 2014/0083588 A1 | 3/2014 | Nahmias Nanni et al. |
| 2014/0196825 A1 | 7/2014 | Nahmias Nanni et al. |
| 2015/0129100 A1 | 5/2015 | Nahmias Nanni et al. |
| 2015/0165821 A1 | 6/2015 | Nahmias Nanni et al. |
| 2015/0203668 A1 | 7/2015 | Bedard et al. |
| 2015/0321516 A1* | 11/2015 | Otani .................. B60C 15/0045 152/541 |
| 2018/0072099 A1 | 3/2018 | Giannini et al. |

FOREIGN PATENT DOCUMENTS

| | | | |
|---|---|---|---|
| EP | 1384601 A1 | 1/2004 | |
| EP | 3064374 A1 * | 9/2016 | ............. B60C 11/03 |
| WO | WO 2012/164433 A1 | 12/2012 | |
| WO | WO 2012/164436 A1 | 12/2012 | |
| WO | WO 2014/032172 A1 | 3/2014 | |
| WO | WO 2016/174628 A1 | 11/2016 | |
| WO | WO 2016/174629 A1 | 11/2016 | |

OTHER PUBLICATIONS

Written Opinion of the International Searching Authority from the European Patent Office in corresponding International Application No. PCT/IB2018/053124 dated Jul. 11, 2018.

\* cited by examiner

TYRE FOR BICYCLE WHEELS

This application is a national stage entry application under 35 U.S.C. § 371 based on International Application No. PCT/IB2018/053124, filed May 4, 2018, and claims priority to Italian Patent Application No. 102017000049520, filed May 8, 2017; the contents of each application is incorporated herein by reference.

FIELD OF THE INVENTION

The present invention regards a tyre for bicycle wheels with improved anti-puncture and rolling resistance performances.

In particular, the present invention regards a tyre for bicycle wheels comprising a tread band containing an anti-puncture system capable of having high resistance to penetration of foreign bodies, simultaneously ensuring optimal handling performances.

The tyre of the present invention can be used in racing bicycle wheels, off-road bicycle wheels (MTB), and in city bicycle wheels.

STATE OF THE ART

A tyre for bicycle wheels typically comprises a carcass structure back-folded around a pair of bead cores and a tread band arranged in radially outer position with respect to the carcass structure.

The carcass structure is intended to resist the inflation pressure and to support the weight of the bicycle and of the cyclist. It comprises one or more carcass plies, each comprising a plurality of suitably-oriented reinforcement cords. In the case of multiple carcass plies, these are tilted with respect to each other to form a cross structure.

The bead cores have the task of ensuring the anchorage of the tyre to the rim of the wheel.

In radially inner position with respect to the carcass structure, an air chamber can be provided in which pressurised air is introduced. In the racing field, but lately also for MTB, types of tyres termed "tubeless" are increasingly widespread, i.e. which lack air chamber. In such tyres the pressurised air acts directly on the carcass structure. The latter and the rim of the wheel are shaped in a manner such that their mutual anchorage ensures the air seal.

The tread band is intended to ensure the adherence of the tyre on the asphalt.

The elastomeric materials used for the composition of the compounds intended for the tread band are generally characterised by the presence of a mixture of reinforcement fillers based on carbon black and/or silica useful for improving the mechanical characteristics thereof, in particular the rigidity. Said elastomeric materials can comprise other commonly used additives, selected on the basis of the specific application towards which the material is intended. For example, the following can be added to said materials: anti-oxidants, anti-aging agents, plasticising agents, adhesives, anti-ozone agents, modifying resins, fibres (e.g. Kevlar® pulp) or mixtures thereof.

EP0329589 describes tyres for vehicle wheels in which at least one of the components is made of an elastomeric compound comprising reinforcement fillers including Kevlar® aramid fibre pulp.

Among the characteristics that are desirable for a tyre for bicycle wheels, resistance to puncture is increasingly requested by users.

In order to ensure high performances in terms of energy waste (consider for example road races), it is suitable to seek a low resistance to rolling. Said low rolling resistance can for example be obtained by reducing the thicknesses of the tyres, limiting the use of reinforcement layers and materials, and using compounds containing materials capable of ensuring low hysteresis values, i.e. to decrease the heat dissipated in dynamic conditions.

The two properties—high puncture resistance and low rolling resistance—require opposing solutions that do not appear combinable with each other.

The problem of puncture resistance, in particular in tyres for bicycle wheels, has been confronted in the art and different solutions for this have been proposed.

In U.S. Pat. No. 8,474,499, for example, a metal laminate is proposed that is puncture resistant, to be interposed between tread band and carcass plies.

In U.S. Pat. No. 9,016,341, a 'breaker' is used, i.e. a textile reinforcement that is puncture resistant, also in this case interposed between tread band and carcass plies. Such solution is proposed in other different documents known in the art and is that most commonly used by tyre manufacturers.

U.S. Pat. No. 8,833,416 describes the use of a modified inner tube, capable of being resistant to air loss after perforation.

EP1384601 describes the insertion, between tread band and carcass plies, of an additional protective layer composed of a very elastic compound capable of improving the puncture resistance, simultaneously improving the rolling resistance due to the high elasticity of the introduced component.

In all cases, it is necessary to introduce, between the components of the tyre, a semi-finished product expressly dedicated to the task of protecting the tyre from puncture. Such insertion however involves the increase of the overall weight of the tyre and, consequently, of the effort required by the cyclist during pedaling. The weight increase can also involve worsened handling and decreased riding precision when going downhill and fast, due to the greater gyroscopic and inertial effects to which the wheel is subjected.

SUMMARY OF THE INVENTION

The Applicant has set the problem of obtaining tyres for bicycle wheels characterised by an improved puncture resistance and by low rolling resistance.

In order to overcome the disadvantages of the prior art, the Applicant has set the objective of making a tread band with an elastomeric compound comprising materials which are capable of simultaneously conferring high anti-puncture protection and low rolling resistance, maintaining, or even improving, the handling characteristics.

The Applicant has found that the use of fibrillated polymer fibres, in compounds intended for producing the tread band, conferred to said compounds increased puncture resistance with respect to that of the materials used for the tread band of normal production.

The Applicant has nevertheless also found that said compounds comprising fibrillated polymer fibres showed dynamic mechanical properties overall worsened with respect to those of the compounds of normal production, above all due to high hysteresis values at 23° C., predictive of a high rolling resistance, and to a decrease of the hysteresis values at 0° C., predictive of a worsened adherence on wet surface.

The Applicant has also found that the use of modified silicate fibres in compounds intended for producing the tread band, in partial substitution of the silica, conferred hysteresis values to said compounds at 0°, 23° and 40° C. that were much lower than those of the materials used for the tread band of normal production, indicative of an improved rolling resistance, but simultaneously of a worsened handling, in particular on wet surface.

The Applicant has nevertheless also encountered that said compounds comprising modified silicate fibres showed low puncture resistance, decidedly lower than that observed in compounds comprising fibrillated polymer fibres and comparable, if not lower, than that of the compounds of normal production.

Even if the aforesaid results did not encourage further experimentation, the Applicant surprisingly found that the use of a reinforcement system constituted by modified silicate fibres and fibrillated polymer fibres, in compounds intended for the production of the tread band, conferred to said compounds puncture resistance values that were very similar to those obtained by using only fibrillated polymer fibres, and hysteresis values very similar to those obtained using only modified silicate fibres, predictive of a low rolling resistance.

The Applicant has nevertheless also found that the use of the aforesaid reinforcement system involved a clear decrease of the hysteresis values at 0° C. of said compounds with respect to those of the compounds of normal production and of the compounds containing only modified silicate fibres, suggested worsened performances on wet surface.

Even if such data indicated an overall worsening of the handling, above all on wet surface, the Applicant has surprisingly found that tyres for bicycle wheels comprising a tread band made with a compound comprising a reinforcement system constituted by modified silicate fibres and fibrillated polymer fibres showed improved handling performances in the tests on dry road surface, and comparable or even improved performances in those on wet surface, with respect to the tyres of normal production.

Therefore, in a first aspect thereof, the present invention regards a tyre for bicycle wheels comprising:
- a carcass structure; and
- a tread band arranged in radially outer position with respect to the carcass structure;

wherein said tread band is made by means of vulcanisation of a cross-linkable elastomeric composition comprising a reinforcement system comprising modified silicate fibres of nanometric size and fibrillated polymer fibres of micrometric size.

Optionally, said tyre for bicycle wheels can also contain a reinforcement layer associated with the carcass structure.

The cross-linkable elastomeric composition useful in the present invention comprises modified silicate fibres of nanometric size.

With the expression "modified silicate fibres of nanometric size", it is intended silicate fibres of nanometric size which have been subjected to modification of their surface portion in the inorganic components thereof. Examples of such modifications are obtainable through processes of partial removal of the magnesium as described, for example, in WO2016174629 or in the Italian patent application No. 102016000108318 filed on 26 Oct. 2016 or by means of processes of deposition of amorphous silica on the surface of the fibres as described, for example, in WO2016174628.

Advantageously, the silicate fibres used in the present invention are fibres selected from the group which consists of silicate fibres of magnesium and/or aluminium and/or calcium and mixtures thereof. Examples of suitable silicate fibres are sepiolite fibres, palygorskite (also known as attapulgite) fibres, halloysite fibres, wollastonite fibres, possibly organically modified, and mixtures thereof. The halloysite and sepiolite fibres, possibly organically modified, and mixtures thereof are particularly preferred.

With the expression "nanometric size" referred to the fibres, it is intended that the fibres have a diameter or maximum size of the transverse section lower than 500 nm.

Preferably, said fibres have a diameter or a maximum size of the transverse section comprised between 1 and 100 nm (nanometres), more preferably between 5 and 50 nm, still more preferably between 15 and 20 nm.

Preferably, said fibres have a length lower than 10 μm (micrometers), more preferably comprised between 0.1 and 10 μm, still more preferably between 0.1 and 5 μm.

Preferably, said modified silicate fibres of nanometric size substantially preserve the original needle-like morphology.

In the present description, with the term "needle-like morphology" it is intended an elongated element having a size (length) much higher than the diameter or the maximum size of the transverse section.

In particular, it is intended that said fibres have a ratio between the greater size (length) and the diameter or the maximum size of the transverse section (aspect ratio) of at least 2:1, preferably of at least 3:1, more preferably of at least 5:1.

Preferably the fibres have an aspect ratio not higher than 1000:1, more preferably not higher than 100:1.

Preferably said ratio is evaluated via microscopic observation, preferably conducted on at least one hundred fibres.

Preferably at least 70%, 80%, 90% of the fibres have the aforesaid aspect ratio.

With the phrase "substantially preserving their needle-like morphology" it is intended to indicate that at the end of the aforesaid modification process at least 50%, 60%, 70% 80%, or 90% of the modified fibres maintain their aspect ratio as previously defined.

In a first embodiment of the process, the silicate fibres with needle-like morphology are preferably silicate fibres comprising magnesium, such as sepiolite fibres, palygorskite (also known as attapulgite) fibres, possibly organically modified, or mixtures thereof.

Generally, the silicate fibres, in particular the natural sepiolite fibres, originally comprise from 12.5% to 15.5% of magnesium with respect to the weight of the fibres themselves. Sepiolite fibres originally comprising 15% of magnesium are particularly preferred.

Examples of silicate fibres with needle-like morphology, which can be used according to the present invention, are the sepiolites Pangel S9 or Pansil 100 or the organically modified sepiolites Pangel B5, Pangel B20, Pangel B40, sold by Tolsa Group (http://www.tolsa.com/).

Advantageously, the modified fibres useful for the present invention are obtained with the process comprising one or more of the following characteristics, taken separately or in combination.

The process of preparation of the modified fibres first of all provides for the suspension of the silicate fibres with needle-like morphology of nanometric size in a suitable liquid medium.

Preferably said suitable liquid medium is selected from among water, alcohols, ethers, ketones and mixtures thereof, more preferably it is selected from among water, mono- or poly-alcohols $C_1$-$C_6$ and mixtures thereof, and still more preferably is water.

Alternatively, the liquid medium can be a $C_1$-$C_6$ alcohol, more preferably isopropanol, or a mixture of water and at least one $C_1$-$C_6$ alcohol, more preferably water and isopropanol.

Preferably, said liquid medium is used in volume/weight ratio with respect to the fibres comprised between 2 and 100 ml/g, preferably between 2 and 50 ml/g, more preferably between 4 and 15 ml/g.

Preferably the suspension of the fibres in the liquid medium is carried out under stirring.

Said suspension can be carried out with various means, for example by using a mechanical blade stirrer, a mechanical mixer, e.g. of the type used for mixing paints or mortar, a magnetic stirrer or via sonification.

The process then provides for adding to the suspension, preferably gradually, at least one acid compound, as described for example in WO2016174629 or in the Italian patent application No. 102016000108318 filed on 26 Oct. 2016, or, alternatively, to place the suspension in contact with a precursor compound of amorphous silica, possibly dissolved or suspended in a second liquid medium, as described, for example, in WO2016174628.

In the first embodiment of the process, with the term "gradually adding" it is intended to indicate that one proceeds with an addition of the acid in successive aliquots, such to bring and then maintain the pH of the medium between 2 and 4. With this mode of gradual addition, at any moment the content of free acid in the reaction medium is always much lower than the stoichiometric level.

Preferably the gradual addition of the acid compound is carried out under stirring.

Preferably the acid is gradually added by means of an automatic feeder controlled by a pH-meter.

Preferably the quantity of acid added overall is lower than 1.4, preferably lower than 1.0, 0.8 or 0.6 moles/mole of magnesium initially present in the silicate.

Preferably the quantity of acid added overall is comprised between 0.75 and 0.4 moles/mole of magnesium initially present in the silicate.

Preferably the acid compound is gradually added in a quantity such to be in the reaction medium in a concentration not higher than 0.01N, more preferably not higher than 0.005N.

Preferably the at least one acid compound is gradually added in a manner such that the concentration of hydrogen ions in the reaction medium is comprised between 0.01 and 0.0005N, more preferably between 0.002N and 0.0008N.

In the present process, the gradual addition of the acid compound is carried out in a manner so as to maintain the pH of the medium between 2 and 4, preferably between 2.5 and 3.5, more preferably between 2.8 and 3.2, still more preferably at a pH around about 3.

Preferably as acid compounds, one or more strong inorganic acids are employed, preferably selected from among hydrochloric acid, nitric acid, phosphoric acid, sulphuric acid or organic acids selected from among acetic acid, formic acid, propionic acid, citric acid, tartaric acid and benzoic acid and mixtures thereof. Preferably hydrochloric acid is used.

Possibly at least one silanising agent can be added to the suspension of the fibres. In such case, the medium is preferably a mono- or poly-alcohol $C_1$-$C_6$, more preferably isopropanol, or mixtures thereof with water, more preferably a water—isopropanol mixture.

Preferably the silanising agent is selected from among mono-functional or bi-functional silanes with one or two or three hydrolysable groups such as bis-(triethoxysilylpropyl) disulfide (TESPD), bis[3-(triethoxysilyl)propyl]tetrasulfide (TESPT), 3-thio-octanoyl-1-propyltriethoxysilane (NXT), $Me_2Si(OEt)_2$, $Me_2PhSiCl$, $Ph_2SiCl_2$, more preferably it is selected between TESPD and TESPT.

Preferably the silanising agent is added in a quantity comprised between 3% and 100% by weight with respect to the weight of the fibres.

Preferably the acidified suspension of the fibres, possibly comprising the silanising agent, is allowed to react under stirring.

Preferably the suspension of the fibres comprising at least one acid compound and possibly at least one silanising agent, is allowed to react at a temperature of at least 20° C., more preferably of at least 40° C., 50° C., 60° C.

Preferably the suspension of the fibres comprising at least one acid compound and possibly at least one silanising agent is allowed to react at a temperature not higher than 100° C., 90° C., 80° C.

Preferably the suspension of the fibres comprising at least one acid compound and possibly at least one silanising agent is allowed to react at a temperature comprised between −10° C. and the boiling temperature of the medium, more preferably between 20 and 100° C., more preferably between 20° C. and 70° C.

Preferably the acidified suspension of the fibres possibly comprising the silanising agent is allowed to react at a pressure lower than 100 bar, more preferably at ambient pressure.

Preferably the acidified suspension of the fibres possibly comprising the silanising agent is allowed to react for a time of at least 5 minutes, preferably of at least 10 or 20 minutes, the reaction time depending on different variables such as the desired amount of extraction of the magnesium, the temperature, the dilution, the stirring, etc.

Preferably the reaction is not prolonged beyond 50 hours, preferably not beyond 20 hours, more preferably not beyond 10 hours.

Preferably, said modified silicate fibres of nanometric size substantially preserve the original crystalline structure.

With the phrase "substantially preserve the crystalline structure" and the like it is intended to indicate that at the end of the aforesaid modification process the modified fibres preserve most of the crystalline structure, in accordance with that shown by the bands of the most intense signals of the IR spectrum in the 850-1040 $cm^{-1}$ (crystalline silicate) range with respect to those in the 1040-1300 $cm^{-1}$ (amorphous silica) range of the IR spectrum.

In particular, in the present context the crystalline structure of the fibres is deemed to be substantially preserved if, after treatment, the ratio between the area under the curve of the IR spectrum in the 850-1040 $cm^{-1}$ range and the area under the curve in the 1040-1300 $cm^{-1}$ range is higher than 0.8, preferably higher than 1, more preferably higher than 1.25.

Preferably the silicate fibres with needle-like morphology of nanometric size modified according to the above-described process comprise from 3.8% to 12%, preferably from 9.5% to 12% magnesium with respect to the weight of the fibres themselves.

The determination of the absolute content of magnesium in the modified silicate fibres can be carried out according to known analytical methods (see as general reference the text "TREATISE ON SOLID STATE CHEMISTRY"; Ed. Norman Bruce Hannay; 1a Ed. (1921), Vol. 1: "The Chemical Structure of Solids", chapter 2.3), such as atomic emission spectroscopy (AES) or atomic absorption spectroscopy, plasma mass spectroscopy (Inductively coupled plasma mass spectrometry or ICP-MS), isotopic dilution, or conventional analyses of gravimetric type.

In a second embodiment of the process, the silicate fibres used are preferably fibres selected from the group which consists of silicate fibres of magnesium and/or aluminium and/or of calcium and mixtures thereof. Examples of suitable silicate fibres are sepiolite fibres, palygorskite (also known as attapulgite) fibres, halloysite fibres, wollastonite fibres, possibly organically modified, and mixtures thereof. The halloysite and sepiolite fibres, possibly organically modified, and mixtures thereof are particularly preferred.

In the second embodiment of the process, by "amorphous silica precursor compound" it is intended a compound or a mixture of compounds capable of generating amorphous silica via hydrolysis in situ, by means of heating and/or in the presence of acids or bases.

Preferably said amorphous silica precursor compound is selected from among:

I. the alkaline salts of silicic acid, with formula $$M_2O.nSiO_2 \quad (I)$$

wherein M=Na, K, Li and wherein n is comprised between 0.5 and 4, preferably n=0.5 or 1 or 3 and M=Na or K, which generate amorphous silica in the presence of acids, II. the tetra-alkyls derived from silicic acid (or tetra-alkoxy-silanes) with formula $$(RO)_4Si \quad (II)$$

wherein the groups R, equal to or different from each other, represent $C_1$-$C_6$ alkyls,
which generate amorphous silica in the presence of water and, preferably, acids or bases, III. the halosilanes with formula $$SiX_4 \text{ or } (RO)_3SiX \text{ or } (RO)_2SiX_2 \text{ or } (RO)SiX_3 \quad (III)$$

wherein the groups R, equivalent to or different from each other, represent $C_1$-$C_6$ alkyls, and X, equivalent to or different from each other, are selected from among chlorine, bromine and iodine, preferably chlorine, which generate amorphous silica in the presence of water and, possibly, bases.

More preferably said amorphous silica precursor compound is selected from among alkaline salts of silicic acid (I) and the alkyl-derivatives of silicic acid (II).

The amorphous silica precursor compound is preferably used in a quantity such as to generate amorphous silica in weight ratio comprised between 1:1 and 1:20, more preferably between 1:2 and 1:10, with respect to the weight of the fibres.

Generally, the hydrolysis of the amorphous silica precursor compound requires the presence of water.

Preferably the first and/or the second liquid medium and/or the possible acid or base comprise water.

Preferably the second liquid medium comprises water.

Generally, the quantity of water in equivalents is at least equal to equivalents of hydrolysable groups present in the amorphous silica precursor compound.

Preferably the reaction medium—resulting from the mixing of the first liquid medium and possibly, if present, of the second liquid medium, of the water, of the acid or of the base—before hydrolysis comprises the water in weight ratio comprised between 1:10 and 5:1 with respect to the weight of the amorphous silica precursor compound.

Preferably in a first variant of the process, the amorphous silica precursor compound is a tetra-alkyl derivative of silicic acid (II), preferably selected from among tetra-methyl orthosilicate, tetra-ethyl orthosilicate, tetra n-propyl silicate, tetra-n-butyl silicate.

In such case, the precursor is advantageously made to react in the presence of acids or bases, preferably bases.

Preferably the basic compound is selected from among ammonia, ammonium hydroxide, hydroxylamine, alkyl, aryl or arylalkyl primary, secondary or tertiary amines, sodium hydroxide, potassium hydroxide, more preferably it is ammonia or ammonium hydroxide.

The basic compound is preferably used in a quantity comprised between 1 and 40% by weight, more preferably between 3 and 20% by weight, with respect to the weight of amorphous silica precursor compound.

The first liquid medium is preferably selected from among water, alcohols, ethers and ketones and mixtures thereof, preferably it is selected from among water, $C_1$-$C_6$ alcohols and mixtures thereof, more preferably it is ethanol or water or mixtures thereof.

Preferably, in a second variant of the process, the amorphous silica precursor compound is an alkaline salt of silicic acid (I), preferably selected from among sodium orthosilicate, sodium metasilicate and potassium orthosilicate, capable of freeing amorphous silica via hydrolysis in the presence of acids.

Preferably, a sodium silicate is used having a weight ratio $SiO_2/Na_2O$ between 2 and 4, more preferably between 3 and 3.7.

Preferred acids are for example strong mineral acids such as hydrochloric acid, sulphuric acid, phosphoric acid and nitric acid. The quantity of acid compound used is at least such to neutralise all the basic functions of the starting silicates.

Preferably the acid is used in a weight ratio comprised between 1:1 and 1:20 with respect to the weight of the amorphous silica precursor compound.

The amorphous silica precursor compound may possibly be dissolved or suspended in a second liquid medium, in order to then be in contact with the suspension of the fibres. Preferably the amorphous silica precursor compound is dissolved in the second liquid medium.

The second liquid medium can be equal to or different from the first liquid medium.

A second liquid medium, for the suspension or preferably the dissolution of the amorphous silica precursor compound, is selected from among water, alcohols, ethers, ketones and mixtures thereof, preferably it is water or a $C_1$-$C_6$ alcohol or mixtures thereof, more preferably it is ethanol or isopropanol or water or mixtures thereof.

Preferably the second liquid medium comprises water.

Preferably the water in the second liquid medium is present in a quantity comprised between 1:1 and 30:1 by weight with respect to the quantity by weight of amorphous silica precursor.

Possibly, if not already present in the first and/or second liquid medium, the water can be suitably added to the reaction medium where the suspension of the fibres was placed in contact with the amorphous silica precursor compound.

Preferably the hydrolysis reaction of the precursor compound and the subsequent modification of the fibres are conducted at a temperature of at least 20° C., more preferably at a temperature comprised between 40° C. and 80° C.

Preferably the hydrolysis reaction of the precursor compound and the subsequent modification of the fibres are conducted for a time of at least 10 minutes, preferably for a time comprised between 10 minutes and 10 hours.

Preferably, the hydrolysis reaction of the precursor compound and the subsequent modification of the fibres are conducted under stirring, preferably by means of mechanical stirring.

The process finally provides for the separation via filtration of the modified fibres as described above, preferably followed by washings with a suitable liquid medium, preferably equal to that used in the reaction, preferably water, followed by air drying or drying under vacuum, possibly heating until the solvent is removed.

Preferably the aqueous washings are conducted up to obtaining a substantially neutral solid, i.e. a solid that when suspended in water that is 1% by weight does not cause a variation of the pH of more than two units with respect to neutrality, i.e. it leads to a suspension with pH comprised between 5 and 9.

The cross-linkable elastomeric composition useful in the present invention comprises fibrillated polymer fibres of micrometric size.

Preferably the fibrillated polymer fibres of micrometric size are fibres of polymers with melting temperature of at least 170° C., preferably of at least 190° C.

The fibrillated polymer fibres useful in the present invention are represented, for example, by aramid fibres (e.g. Kevlar® Pulp by DuPont® or Twaron® pulp by Teijin Aramid), polyester fibres (e.g. Vectran® Pulp by Engineered Fibers Technology), acrylic fibres (e.g. CFF® Fibrillated Fiber by Engineered Fibers Technology and CFF® Pulp by Sterling Fibers), microfibrillated cellulose fibres (e.g. WMFC Q_ECO, by WEIDMANN FIBER TECHNOLOGY), and plant fibres (e.g. Setralit® by ECCO Gleittechnik).

With the expression "fibrillated polymer fibres" it is intended that the fibres themselves have an irregular and branched form, with a main trunk from which thinner filaments of frayed fibres depart, which confer a greater surface area to the fibre as well as improved anchoring and bonding characteristics with respect to the non-fibrillated fibre. The "fibrillated polymer fibres" are obtained from non-fibrillated fibres through mechanical, thermal and chemical processes.

With the expression "micrometric size" referred to the fibres it is intended that the fibres have a diameter or maximum size of the transverse section lower than 100 μm (micrometers).

The aramid fibres are synthetic fibres obtained from aromatic polyamides, i.e. a particular class of nylon obtained via condensation in solution of aromatic diamines and aromatic bicarboxylic acids. Aramid fibres and their process of preparation are widely known in the literature and for example described in the U.S. Pat. Nos. 3,006,899, 3,063,966, 3,094,511, 3,287,323, 3,322,728, 3,349,062, 3,354,127, 3,380,969, 3,671,542, and 3,951,914.

Kevlar® is a particular aramid fibre obtained via condensation in solution starting from the monomers 1,4-phenylenediamine (para-phenylenediamine) and terephthaloyl chloride.

Kevlar® pulp is a material obtained via fibrillation of the Kevlar® fibres according to a proprietary DuPont® technology. Kevlar® pulp typically has fibres with overall length of 0.5-1 mm, surface area of 7-11 m$^2$/g and diameter of the main fibres between 10 and 18 micrometers (μm).

Polyester fibres are synthetic fibres obtained from polyesters, i.e. polymers obtained via condensation of monomers comprising at least one carboxyl group (—COOH) and at least one hydroxyl group (—OH).

Vectran® is a completely aromatic based polyester with crystalline liquid characteristics at the molten state, obtained via condensation of 4-hydroxybenzoic acid with 6-hydroxy-2-carboxy naphthalene acid, produced by Kuraray and Celanese.

"Vectran® Pulp" is a material obtained via fibrillation of the Vectran® fibres, e.g. by Engineered Fibers Technology. Vectran® pulp typically has fibres of overall length from 1 to 6 mm and diameter of the fibrils of a few micrometers.

Acrylic fibres are synthetic fibres obtained from polyacrylates, i.e. polymers obtained via polymerisation, typically radical polymerisation, of acrylic monomers and in particular of acrylonitrile.

"CFF® pulp" is obtained via fibrillation of the fibres of specific grades of polyacrylate by Engineered Fibers Technology, it has main fibres with diameter of about 20 μm and length up to 7 mm, fibrils of diameter around 1 μm, and surface area up to 50 m$^2$/g.

The microfibrillated cellulose fibres are natural fibres obtained via cellulose fibrillation, for example by WEIDMANN FIBER TECHNOLOGY, generally have length of 0.05-1 mm, and diameter of the fibrils typically lower than 1 μm.

The natural fibrillated fibres Setralit® by ECCO Gleittechnik are obtained via mechanical treatment of plant fibres and have maximum length of 7-8 mm and surface area around 1 m$^2$/g The fibrillated polymer fibres preferably used in the present invention are constituted by a main trunk with a length comprised between about 0.05 and about 8 mm, preferably by about 0.1 to about 2 mm, a diameter comprised between 5 and 30 μm, and an aspect ratio higher than 30, from which a plurality of fibrils depart with a diameter lower than the diameter of the main trunk. The fibrillated polymer fibres have a surface area comprised between about 0.5 and about 60 m$^2$/g, from about 10 to about 200 times greater than the surface area of an equivalent but non-fibrillated polymer fibre.

The cross-linkable elastomeric composition useful in the present invention comprises 100 phr of at least one diene elastomeric polymer.

Preferably, the diene elastomeric polymer which can be used in the present invention can be selected from among those commonly used in elastomeric materials crosslinkable with sulfur, which are particularly adapted for producing tyres, i.e. from elastomeric polymers or copolymers with an unsaturated chain having a glass transition temperature (Tg) generally lower than 20° C., preferably comprised in the interval from 0° C. to −110° C. These polymers or copolymers can be of natural origin or they can be obtained by means of polymerisation in solution, polymerisation in emulsion or polymerisation in gaseous phase of one or more conjugated diolefins, possibly mixed with at least one comonomer selected from among monovinylarenes and/or polar comonomers in a quantity not higher than 60% by weight.

The conjugated diolefins generally contain from 4 to 12, preferably from 4 to 8 carbon atoms and can be selected, for example, from the group comprising: 1,3-butadiene, isoprene, 2,3-dimethyl-1,3-butadiene, 1,3-pentadiene, 1,3-hexadiene, 3-butyl-1,3-octadiene, 2-phenyl-1,3-butadiene and mixtures thereof. 1,3-butadiene and isoprene are particularly preferred.

Monovinylarenes, which can be possibly used as comonomers, generally contain 8 to 20, preferably from 8 to 12 carbon atoms and can be selected for example from among: styrene; 1-vinylnaphthalene; 2-vinylnaphthalene; various styrene alkyl, cycloalkyl, aryl, alkylaryl or arylalkyl derivatives such as, for example, α-methylstyrene, 3-methylstyrene, 4-propylstyrene, 4-cyclohexylstyrene, 4-dodecylstyrene, 2-ethyl-4-benzylstyrene, 4-p-tolylstyrene, 4-(4-phenylbutyl)styrene, and mixtures thereof. Styrene is particularly preferred.

Polar comonomers, which can be possibly used, can for example be selected from among: vinylpyridine, vinylquinoline, acrylic acid and alkylacrylic acid esters, nitriles, or mixtures thereof, such as, for example, methyl acrylate, ethyl acrylate, methyl methacrylate, ethyl methacrylate, acrylonitrile and mixtures thereof.

Preferably, the diene elastomeric polymer which can be used in the present invention can for example be selected from among: cis-1,4-polyisoprene (natural or synthetic, preferably natural rubber), 3,4-polyisoprene, polybutadiene (in particular polybutadiene with a high content of 1,4-cis), isoprene/isobutene copolymers, possibly halogenated, 1,3-butadiene/acrylonitrile copolymers, styrene/1,3-butadiene copolymers, styrene/isoprene/1,3-butadiene copolymers, styrene/1,3-butadiene/acrylonitrile copolymers, and mixtures thereof.

According to a preferred embodiment, said cross-linkable elastomeric composition comprises at least 10% by weight of natural rubber, preferably between 20% by weight and 100% by weight, with respect to the total weight of said at least one diene elastomeric polymer.

The aforesaid cross-linkable elastomeric composition can possibly comprise at least one elastomeric polymer of one or more monoolefins with an olefin comonomer or derivatives thereof (a'). The monoolefins can be selected from among: ethylene and α-olefins generally containing from 3 to 12 carbon atoms, such as, for example, propylene, 1-butene, 1-pentene, 1-hexene, 1-octene and mixtures thereof. The following are preferred: copolymers from among ethylene and an α-olefin, possibly with a diene; isobutene homopolymers or copolymers thereof with small quantities of a diene, which are possibly at least partly halogenated. The possibly present diene generally contains from 4 to 20 carbon atoms and is preferably selected from among: 1,3-butadiene, isoprene, 1,4-hexadiene, 1,4-cyclohexadiene, 5-ethylidene-2-norbornene, 5-methylene-2-norbornene, vinylnorbornene and mixtures thereof. Among these, the following are particularly preferred: ethylene/propylene copolymers (EPR) or ethylene/propylene/diene copolymers (EPDM); polyisobutene; butyl rubbers; halobutyl rubbers, in particular chlorobutyl or bromobutyl rubbers; or mixtures thereof.

A diene elastomeric polymer can be used, or an elastomeric polymer functionalised by means of reaction with suitable terminating agents or coupling agents. In particular, the diene elastomeric polymers obtained by means of anionic polymerisation in the presence of an organometallic initiator (in particular an organolithium initiator) can be functionalised by making the residual organometallic groups derived from the initiator react with suitable terminating agents or coupling agents such as, for example, imines, carbodiimides, tin alkyl halides, substituted benzophenones, alkoxysilanes or aryloxysilanes.

According to the present invention, the modified silicate fibres with needle-like morphology of nanometric size and fibrillated polymer fibres (e.g. Kevlar® Pulp) of micrometric size are incorporated in the diene elastomeric polymer together with the other components, in order to give the cross-linkable elastomeric composition with which the tread band of tyre for bicycle wheels is attained.

Preferably said modified fibres are present in the elastomeric composition in a quantity from 1 phr to 60 phr, preferably from 3 phr to 40 phr, more preferably from 5 phr to 30 phr.

Preferably said polymer fibres are present in the elastomeric composition in a quantity from 0.1 phr to 20 phr, preferably from 0.5 phr to 10 phr, more preferably from 1 phr to 5 phr.

Preferably, the cross-linkable elastomeric composition according to the present invention comprises a standard reinforcement filler.

Preferably the standard reinforcement filler is selected from among carbon black, precipitated amorphous silica, amorphous silica of natural origin, non-modified silicate fibres and mixtures thereof.

Preferably, the standard reinforcement filler is present in the cross-linkable elastomeric composition in a quantity generally comprised between 1 phr and 120 phr, preferably between 20 phr and 90 phr.

Preferably, the overall quantity of modified silicate fibres and standard filler present in the cross-linkable elastomeric composition according to the invention is at least 20 phr, more preferably at least 30 phr.

Preferably, the overall quantity of modified silicate fibres and standard filler present in the cross-linkable elastomeric composition according to the invention is comprised between 20 phr and 120 phr, more preferably between 30 phr and 90 phr.

Preferably, the standard reinforcement filler is carbon black having a surface area not lower than 20 $m^2/g$ (determined by STSA—statistical thickness surface area according to ISO 18852:2005)

Preferably, said carbon black reinforcement filler is present in the cross-linkable elastomeric composition in a quantity comprised between 1 phr and 120 phr, preferably between 20 phr and 90 phr.

Advantageously, the standard reinforcement filler is silica, selected from a pyrogenic silica or, preferably a precipitated silica, with a BET surface area (measured according to the standard ISO 5794/1) comprised between 50 $m^2/g$ and 500 $m^2/g$, preferably between 70 $m^2/g$ and 200 $m^2/g$.

The cross-linkable elastomeric composition according to the present invention comprises at least one vulcanising agent.

The vulcanising agent most advantageously used is sulfur, or alternatively molecules containing sulfur (sulfur donors), with accelerators, activators and/or retardants known to those skilled in the art.

The sulfur or its derivatives can be advantageously selected, for example, between: (i) soluble sulfur (crystalline sulfur); (ii) insoluble sulfur (polymeric sulfur); (iii) sulfur dispersed in oil (e.g. 33% sulfur known with the commercial name Crystex OT33 by Eastman); (iv) sulfur donors such as, for example, caprolactam disulfide (CLD), bis[(trialkoxysilyl)propyl]polysulfides, dithiophosphates; and mixtures thereof.

The vulcanising agent is present in the cross-linkable elastomeric composition of the invention in a quantity from 0.1 to 15 phr, preferably from 0.5 to 10 phr, still more preferably from 1 to 7 phr.

The cross-linkable elastomeric composition according to the present invention may possibly also comprise at least one silane coupling agent capable of interacting with the silica possibly present as reinforcement filler and/or the silicates and bonding them to the diene elastomeric polymer during vulcanisation.

Preferably the cross-linkable elastomeric composition comprises at least one coupling agent.

Preferably, the silane coupling agent which can be used in the present invention is selected from among those having at least one hydrolysable silane group, which can for example be identified by the following general formula (I):

$$(R)_3Si\text{—}C_nH_{2n}\text{—}X \tag{I}$$

wherein the groups R, which can be identical or different, are selected from among: alkyl, alkoxy or aryloxy groups or from halogen atoms, on condition that at least one of the groups R is an alkoxy or aryloxy group or a halogen; n is an integer between 1 and 6 (6 included); X is a group selected from among: nitrous, mercapto, amino, epoxide, vinyl, imide, chloro, $\text{—}(S)_mC_nH_{2n}\text{—}Si\text{—}(R)_3$ and $\text{—}S\text{—}COR$, wherein m and n are integers between 1 and 6 (6 included) and the groups R are defined as stated above.

Among the silane coupling agents, those particularly preferred are bis(3-triethoxysilylpropyl) tetrasulfide and bis (3-triethoxysilylpropyl) disulfide. Said coupling agents can be used as is or as a suitable mixture with an insert filler (e.g. carbon black) in a manner so as to facilitate their incorporation in the cross-linkable elastomeric composition.

Preferably, said silane coupling agent is present in the cross-linkable elastomeric composition in a quantity comprised between 0.1 phr and 20 phr, preferably between 0.5 phr and 10 phr.

Preferably the vulcanising agent is used in combination with accelerants and activators known to those skilled in the art.

The accelerants which are commonly used can be selected from among: dithiocarbamates, guanidine, thiourea, thiazoles, sulfenamides, thiurams, amines, xanthates and mixtures thereof.

Preferably the accelerants of vulcanisation are present in the cross-linkable elastomeric composition of the invention in a quantity from 0.1 to 8 phr, preferably from 0.3 to 6 phr.

The activators which are particularly effective are compounds of zinc and in particular ZnO, $ZnCO_3$, zinc salts of saturated or unsaturated fatty acids containing 8 to 18 carbon atoms, such as zinc stearate, which are preferably formed in situ in the cross-linkable elastomeric composition by ZnO and fatty acid, as well as $Bi_2O_3$, PbO, $Pb_3O_4$, $PbO_2$, or mixtures thereof.

Preferably the activators of vulcanisation are present in the cross-linkable elastomeric composition of the invention in a quantity from 0.2 to 15 phr, preferably from 0.5 to 10 phr.

Finally, the above-described cross-linkable elastomeric materials can comprise other commonly-used additives, selected on the basis of the specific application for which the composition is intended. For example, the following can be added to said materials: anti-oxidants, anti-aging agents, plasticising agents, adhesives, anti-ozone agents, modifying resins, or mixtures thereof.

In particular, in order to further improve workability, at least one plasticising agent can be added to said cross-linkable elastomeric composition, generally selected from among mineral oils, plant oils, synthetic oils, polymers with low molecular weight and mixtures thereof, such as, for example, aromatic oil, naphthenic oil, phthalates, soy oil and mixtures thereof. The quantity of plasticising agent is generally comprised between 0 phr and 70 phr, preferably between 5 phr and 30 phr.

The abovementioned cross-linkable elastomeric compositions can be prepared by mixing together the polymer components with the reinforcement filler and with the other additives possibly present according to the techniques known in the art. For example the mixing can be executed by using an open mixer of "open-mill" type or an internal mixer of the type with tangential rotors (Banbury®) or with penetrating rotors (Intermix), or in continuous mixers of Ko-Kneader™ (Buss®) type or of the type with twin screw or multi-screw.

Preferably, the carcass structure of the tyre of the present invention comprises at least one carcass ply engaged, at its axially opposite end flaps, with a pair of anchoring annular structures and including a plurality of reinforcement cords tilted, with respect to an equatorial plane of the tyre, by a first angle comprised between about 30° and about 60°, ends included.

Preferably, the reinforcement cords of said at least one carcass ply are made of a textile material, so as to limit the weight of the tyre as much as possible.

In a first embodiment of the tyre, the carcass structure comprises a single carcass ply. Hereinbelow, such tyre is also indicated as "single-ply tyre".

In a second embodiment of the tyre, the carcass structure comprises a first carcass ply including a first plurality of reinforcement cords tilted, with respect to said equatorial plane, by said first angle and a second carcass ply arranged in radially outer position with respect to the first carcass ply and including a second plurality of reinforcement cords tilted, with respect to said equatorial plane, by said first angle on the side opposite said first plurality of cords, so as to define a cross carcass structure, preferably dual-ply. Hereinbelow, such tyre is also indicated as "dual-ply tyre".

In alternative embodiments, the carcass structure can comprise more than two carcass plies, each carcass ply being arranged so as to define a cross structure with the radially internal carcass ply adjacent, in a manner entirely identical to that described above with reference to the first and second carcass plies.

In other embodiments (not illustrated), for example intended for tyres for particularly long races or races on partially irregular surfaces (sett paving, gravel roads), further reinforcement plies can also be provided, axially arranged between the beads, preferably radially between the carcass plies.

Preferably, in the case of single-ply tyre, said first angle is preferably higher than about 30°, more preferably higher than about 40°, still more preferably equal to about 45°.

Preferably, in the case of "dual-ply" tyre, said first angle is comprised between about 30° and about 60°, ends included.

In the case of tyre for racing or city bicycle wheels, preferably, the single carcass ply (in the case of single ply tyre), or each of the carcass plies (in the case of tyre with two or more carcass plies), has a density higher than, or equal to, about 15 TPI, more preferably higher than, or equal to, about 30 TPI, still more preferably higher than, or equal to, about 60 TPI, still more preferably, higher than, or equal to, about 120 TPI.

In the case of tyre for racing or city bicycle wheels, preferably, the single carcass ply (in the case of single-ply tyre), or each of the carcass plies (in the case of tyre with two or more carcass plies), has a density lower than, or equal to, about 360 TPI, more preferably lower than, or equal to, about 300 TPI, still more preferably lower than, or equal to, about 240 TPI, still more preferably lower than, or equal to, about 200 TPI.

In the case of tyre for off-road bicycle wheels, preferably, the single carcass ply (in the case of single-ply tyre), or each of the carcass plies (in the case of tyre with two or more carcass plies), has a density higher than, or equal to, about 15 TPI, more preferably higher than, or equivalent to, about 30 TPI.

In the case of tyre for off-road bicycle wheels, preferably, the single carcass ply (in the case of single-ply tyre), or each of the carcass plies (in the case of tyre with two or more carcass plies), has a density lower than, or equal to, about 120 TPI, more preferably lower than, or equal to, about 90 TPI.

It is preferable that, in the case of dual-ply tyre (or with more than two carcass plies), the second carcass ply (or at least one other carcass ply) has a density substantially identical to that of the first carcass ply.

Preferably, the reinforcement cords of the single carcass ply (in the case of single-ply tyre) or of each carcass ply (in the case of dual-ply tyre or tyre with more than two carcass plies) have a diameter lower than, or equal to, about 0.55 mm, more preferably lower than, or equal to, about 0.35 mm.

Preferably, the reinforcement cords of the single carcass ply (in the case of single-ply tyre) or of each carcass ply (in the case of dual-ply tyre or with more than two carcass plies) have a diameter higher than, or equal to, about 0.10 mm, more preferably higher than, or equal to, about 0.12 mm.

Preferably, the reinforcement cords of the single carcass ply (in the case of single-ply tyre) or of each carcass ply (in the case of dual-ply tyre or with more than two carcass plies) have a linear density higher than, or equal to, about 110 dtex, more preferably higher than, or equal to, about 230 dtex.

Preferably, the reinforcement cords of the single carcass ply (in the case of single-ply tyre) or of each carcass ply (in the case of dual-ply tyre or with more than two carcass plies) have a linear density lower than, or equal to, about 1300 dtex, more preferably lower than, or equal to, about 940 dtex.

Preferably, in the case of tyre for racing bicycle wheels, the tyre has a weight lower than about 350 g, preferably lower than, or equal to, about 250 g r.

Preferably, in the case of tyre for off-road bicycle wheels, the tyre has a weight higher than, or equal to, about 300 g, more preferably higher than, or equal to, about 350 g.

Preferably, in the case of tyre for city bicycle wheels, the tyre has a weight higher than about 250 g, preferably higher than, or equal to, about 350 g.

Preferably, in the case of tyre for off-road or city bicycle wheels, the tyre has a weight lower than, or equal to, about 2 Kg, more preferably lower than, or equal to, about 1.5 Kg, still more preferably lower than, or equal to about 750 g, still more preferably lower than, or equal to, about 650 g.

In preferred embodiments, in the case of tyre for off-road bicycle wheels, the tyre has a weight comprised between about 300 g and about 2 Kg, more preferably between about 350 g and about 1.5 Kg, more preferably between about 350 g and about 750 g, more preferably between about 350 g and about 650 g, ends included.

The tyre for bicycle wheels of the present invention can optionally also contain a belt layer associated with the carcass structure.

Preferably, the belt layer comprises at least one reinforcement cord wound on the carcass structure according to a winding direction oriented, with respect to said equatorial plane, at a second angle comprised between about 0° and about 30°, ends included.

In a first embodiment, said at least one reinforcement cord of said at least one belt layer is helically wound on the carcass structure according to said winding direction.

In an alternative embodiment, said at least one belt layer comprises a plurality of parallel reinforcement cords, each of which wound on the carcass structure according to said winding direction.

Preferably, said second angle is comprised between about 0° and about 5°, ends included.

More preferably, said winding direction is substantially circumferential, i.e. said second angle is substantially equal to about 0°.

Preferably, said at least one belt layer has a width lower than the width of the tyre.

More preferably, the width of said at least one belt layer is higher than 20% of the width of the tyre, more preferably higher than 30% of the width of the tyre, still more preferably higher than 40% of the width of the tyre.

More preferably, the width of said at least one belt layer is lower than 80% of the width of the tyre, more preferably lower than 70% of the width of the tyre, still more preferably lower than 65% of the width of the tyre.

Preferably, the reinforcement cord/cords of said at least one belt layer is/are made of a textile material. Still more preferably, the reinforcement cords of the carcass structure and of said at least one belt layer are made of the same textile material.

Preferably, said at least one belt layer has a density higher than, or equal to, about 15 TPI, more preferably higher than, or equal to, about 30 TPI.

Preferably, said at least one belt layer has a density lower than, or equal to, about 360 TPI, more preferably lower than, or equal to, about 300 TPI.

Preferably, the reinforcement cord/cords of said at least one belt layer has/have a diameter lower than, or equal to, about 0.55 mm, more preferably lower than, or equal to, about 0.35 mm.

Preferably, the reinforcement cord/cords of said at least one belt layer has/have a diameter higher than, or equal to, about 0.10 mm, more preferably higher than, or equal to, about 0.12 mm.

It is preferable that the reinforcement cord/cords of said at least one belt layer has/have a diameter substantially identical to that of the reinforcement cords used in the carcass structure.

Preferably, the reinforcement cord/cords of said at least one belt layer has/have a linear density higher than, or equal to, about 110 dtex, more preferably higher than, or equal to, about 230 dtex.

Preferably, the reinforcement cord/cords of said at least one belt layer has/have a linear density lower than, or equal to, about 1300 dtex, more preferably lower than, or equal to, about 940 dtex.

Preferably, the reinforcement cord/cords of said at least one belt layer is/are made of a textile material.

In particularly preferred embodiments of the tyre, the same type of reinforcement cord is used both in the carcass structure and in said at least one belt layer.

Still more preferably, the reinforcement cords of the carcass structure and of said at least one belt layer are made of the same textile material.

Said at least one carcass ply can comprise opposite end flaps butt joined at said at least one reinforcement layer (i.e. below the reinforcement layer), or at least partially superimposed on each other at the reinforcement layer, or axially spaced from each other. In the latter case, the end flaps can be positioned below the reinforcement layer or be in axially different positions from that of the reinforcement layer. In the case of dual-ply tyre, both the carcass plies can have the respective opposite end flaps with identical mutual arrangement, or one of the carcass plies can have a mutual arrangement of its end flaps different from that of the other carcass ply. In this latter case, a preferred configuration is that in which the end flaps of the radially more internal carcass ply are axially spaced from each other and in axial positions different from that of the reinforcement layer, while the end flaps of the radially more external carcass ply are butt joined at said at least one reinforcement layer (i.e. below the reinforcement layer).

DETAILED DESCRIPTION OF EMBODIMENTS OF THE INVENTION

Further characteristics and advantages of the tyre of the present invention will be clearer from the following detailed description of several preferred embodiments thereof, made with reference to the enclosed drawings. In such drawings.

Figure 1:
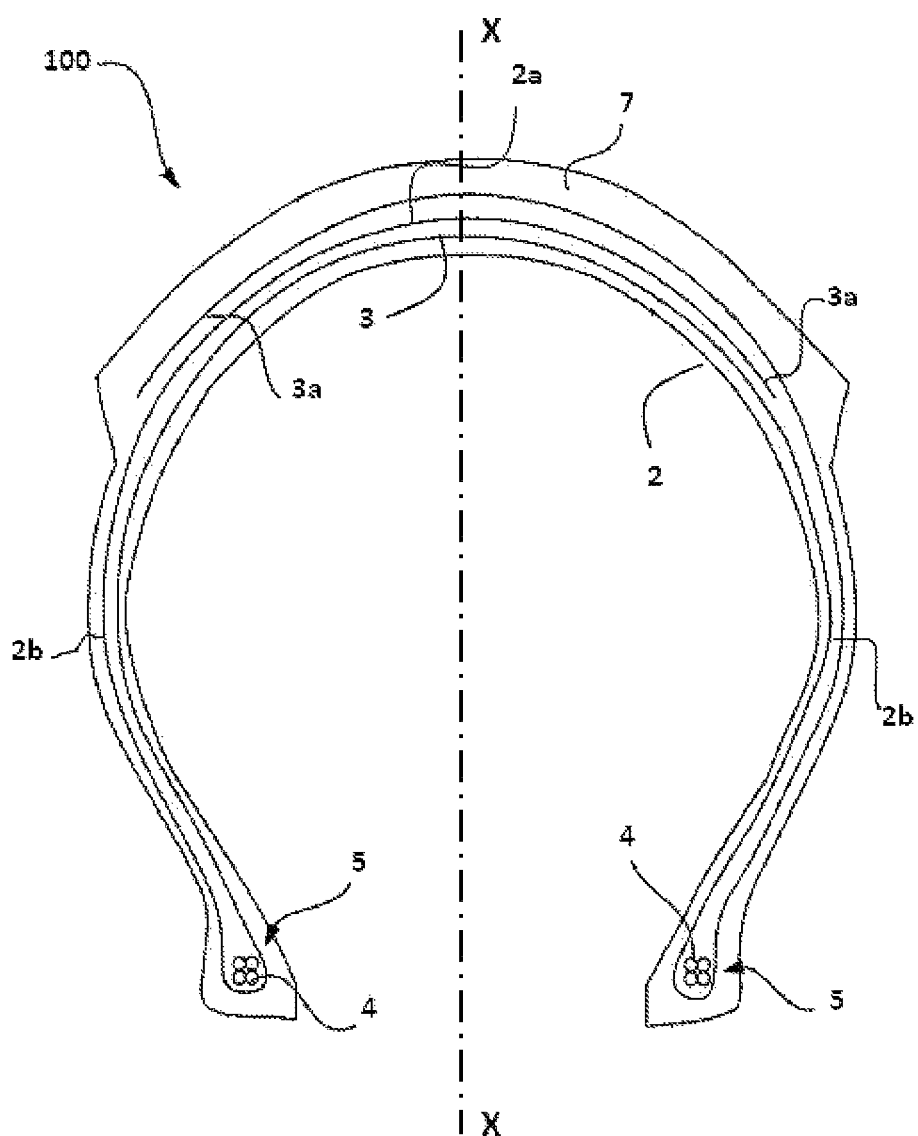
FIG. 1 is a schematic view in radial section of a tyre for racing bicycle wheel in accordance with a first embodiment of the present invention.

In FIG. 1, reference number 100 overall indicates a tyre for bicycle wheels according to the present invention. The tyre can be intended to be mounted on the wheels of a racing bicycle, or off-road bicycle (mountain bike or MTB) or city bicycle (urban bike or city bike).

The tyre 100 of FIG. 1 comprises a carcass structure 2 comprising a crown portion 2a preferably symmetrically arranged with respect to the equatorial plane X-X and opposite lateral portions 2b arranged on axially opposite side of the crown portion 2a.

In the embodiment illustrated in the enclosed drawings, the carcass structure 2 comprises only one carcass ply 3 (single-ply tyre), but other embodiments are provided (such as those schematised in FIGS. 6 and 7) in which the carcass structure 2 comprises multiple carcass plies, preferably two (dual-ply tyre).

That described below with reference to the carcass ply illustrated in the drawings is applied both to the single carcass ply of the single-ply tyre and to each carcass ply of the dual-ply tyre, except where explicitly stated otherwise.

The carcass ply 3 is axially extended from a lateral portion 2b of the carcass structure 2 to the opposite lateral portion 2b.

The carcass ply 3 is engaged, at its axially opposite respective end flaps 3a, with respective anchoring annular structures 4, typically termed "bead cores".

Each end flap 3a of the carcass ply 3 is back folded around a respective bead core 4.

In an alternative embodiment, not illustrated, the carcass ply has its axially opposite end flaps associated without back-fold with the anchoring annular structures, provided with two annular inserts. A filler made of elastomeric material can be arranged in axially outer position with respect to the first annular insert. The second annular insert is instead arranged in an axially outer position with respect to the end of the carcass layer. Finally, in axially outer position with respect to said second annular insert, and not necessarily in contact therewith, a further filler can be provided that terminates the production of the anchoring annular structure.

The bead cores 4 are preferably made of textile fibres with high elastic modulus, such as aramid fibres (common name for aromatic polyamide fibres) or they are made of metal wires, such as steel wires.

On the outer perimeter edge of the bead cores 4, a tapered elastomeric filler can be applied that occupies the space defined between the carcass ply 3 and the respective back-folded end flap 3a.

The zone of the tyre comprising the bead core 4 and the possible elastomeric filler forms the so-called "bead", indicated overall in FIG. 1 with 5, intended for anchoring, by means of elastically forced fitting, the tyre on a corresponding mounting rim, not illustrated.

In the back-folded end flap 3a of the carcass ply 3, at each bead 5, a reinforced belt-like element 10 can be applied. Such reinforced belt-like element 10 is situated interposed between the carcass ply 3 and the rim of the wheel when the tyre is mounted on such rim.

In place of the reinforced belt-like element 10, a single reinforcement cord can be used, deposited possibly upon tackifying treatment.

With reference to the tyre of FIG. 1, the two flaps of the up-turns of carcass 3a are each extended to cover the crown portion 2a, being superimposed to form, with a first radially internal carcass layer, three carcass layers in the crown portion 2a.

With reference to FIGS. 2-7, a reinforcement layer 6 is illustrated associated with the carcass structure 2 at the crown portion 2a, which can possibly be present in the tyre as a further anti-puncture protection thereof.

In radially outer position with respect to the carcass structure 2 and, if present, with respect to the reinforcement layer 6, a tread band 7 is provided by means of which the contact of the tyre 100 with the road surface occurs.

The tyre 100—if intended for racing bicycle wheels—typically has an axial size (also indicated herein as "axial extension" or "width") preferably comprised between about 19 mm and about 38 mm, more preferably between about 19 mm and about 32 mm, still more preferably between about 23 mm and about 28 mm, ends included. The tyre 100 intended for various types of bicycles has an outer diameter (which according to the English name is expressed in inches) preferably comprised between about 24 inches and about 29 inches, more preferably comprised between about 26 inches and about 29 inches, ends included. Correspondingly, the shrinking diameter according to the ISO or E.T.R.T.O. convention is preferably equal to about 559 mm (which corresponds to an outer diameter of 26 inches for off-road bicycles (MTB), or equal to about 571 mm (which corresponds to an outer diameter of 26 inches for road racing bicycles), or equal to about 584 mm (which corresponds to an outer diameter of 27.5 inches for off-road bicycles), or equal to about 622 mm (which corresponds to an outer diameter of 28 inches for road racing bicycles or to an outer diameter of 29 inches for off-road bicycles) or equal to about 630 mm (which corresponds to a particular outer diameter of 27 inches for road racing bicycles).

For example, a first embodiment of the tyre 100 of FIG. 1 has an outer diameter equal to 26 inches, a second embodiment has an outer diameter equal to 28 inches, and a third embodiment has an outer diameter equal to 29 inches.

In case of tyre intended for wheels of off-road bicycles (MTB), the tyre 100 has an axial size preferably comprised between about 37 mm and about 120 mm, ends included.

The tyre 100 intended for city bicycle wheels typically has an axial size preferably comprised between about 32 mm and 62 mm ends included.

The tyre 100 for off-road or city bicycles has an outer diameter preferably comprised between about 26 inches and about 29 inches, ends included. Correspondingly, the shrinking diameter according to the ISO or E.T.R.T.O. convention is preferably comprised between about 559 mm and about 622 mm.

For example, a first embodiment of the tyre 100 of FIG. 1 has an outer diameter equal to 26 inches (shrinking diameter equal to 559 mm), a second embodiment has an outer diameter equal to 27.5 inches (shrinking diameter equal to 584 mm) and a third embodiment has an outer diameter equal to 29 inches (shrinking diameter equal to 622 mm).

The carcass ply 3 of the tyre 100 is preferably made of elastomeric material and comprises a plurality of reinforcement cords 30 arranged substantially parallel to each other. In FIGS. 2-7, the reference number 30 is associated with the set of reinforcement cords.

The reinforcement cords 30 are preferably made of a textile material selected from among Nylon, Rayon, PET, PEN, Lyocell, Aramid, or combinations thereof, in one or more plies, preferably 1 or 2 plies.

The reinforcement cords 30 have a diameter preferably comprised between about 0.10 mm and about 0.55 mm, more preferably between about 0.12 mm and about 0.35 mm, ends included, e.g. equal to about 0.13 mm.

The reinforcement cords 30 have a linear density comprised between about 110 dtex and about 1300 dtex, more preferably between about 230 dtex and about 940 dtex, ends included, e.g. equal to about 470 dtex.

Specific examples of textile materials usable for the aforesaid reinforcement cords 30 are the following:

Nylon 930 dtex/1
Nylon 470 dtex/1
Nylon 230 dtex/1
Aramid 470/1 wherein the number 1 after dtex indicates the number of plies.

The reinforcement cords 30 can nevertheless be made of steel, and in such case they have a diameter preferably comprised between 0.10 mm and 0.175 mm, ends included.

The reinforcement cords 30 are tilted, with respect to the equatorial plane of the tyre 100, by an angle comprised between about 30° and about 60°, ends included.

Preferably, in the case of single-ply tyre, the aforesaid angle is about 45°, and in such case the back-fold flaps can have tilts in the crown portion that are parallel to each other and counter-tilted in proximity to the equatorial plane with respect to the tilt of the reinforcement elements of the first carcass layer (radially more internal). In the case instead of dual-ply tyre, a first carcass ply includes a plurality of reinforcement cords tilted, with respect to the equatorial plane of the tyre, by an angle preferably comprised between about 30° and about 60°, ends included, and a second carcass ply, arranged in radially outer position with respect to the first carcass ply, includes a second plurality of reinforcement cords tilted by the same angle, with respect to said equatorial plane, on opposite sides with respect to the reinforcement cords of the first carcass ply. In this latter case, the reinforcement cords lie on respective planes tilted with respect to the rotation axis Z, thus defining a cross carcass structure.

The carcass ply 3 of the tyre 100 for racing or city bicycle wheels preferably has a density comprised between about 15 TPI and about 360 TPI, more preferably between about 30 TPI, and about 300 TPI, ends included, e.g. equal to about 240 TPI.

Preferably, in the case of dual-ply tyre, each carcass ply has a density comprised between about 15 TPI and about 200 TPI, more preferably between about 30 TPI and about 180 TPI, ends included, e.g. equal to about 120 TPI.

The carcass ply 3 of the tyre 100 for off-road bicycle wheels (MTB) preferably has a density comprised between about 15 TPI and about 120 TPI, more preferably between about 30 TPI and about 90 TPI.

Preferably, in the case of dual-ply tyre or with more than two carcass plies, each carcass ply has a density comprised between about 15 TPI and about 120 TPI, more preferably between about 30 TPI and about 90 TPI.

The tyre 100 illustrated in FIG. 1 does not comprise reinforcement layers, but different embodiments can be provided comprising a reinforcement layer as in the structures illustrated in FIGS. 2-7 or comprising more than one reinforcement layer.

The reinforcement layer 6 is axially extended on the crown portion 2a of the carcass structure 2 for a predetermined width section.

Preferably, such width is lower than the width of the tyre 100. More preferably, in the tyre 100 of FIG. 1 such width is comprised between 20% and 80% of the width of the tyre 100, still more preferably between 30% and 70% of the width of the tyre 100, still more preferably between 40% and 65% of the width of the tyre 100, ends included, while in the tyre for off-road bicycles (MTB) such width is comprised between 30% and 90% of the width of the tyre 100, still more preferably between 40% and 80% of the width of the tyre 100, still more preferably between 60% and 70% of the width of the tyre 100, ends included.

For example, in a tyre 100 for racing bicycle wheels having axial size comprised between 19 and 38 mm, the width of the reinforcement layer 6 is equal to at least 8 mm. Preferably, such width is lower than 24 mm.

For example, in a tyre 100 for off-road bicycle wheels (MTB) having axial size comprised between 50 mm and 70 mm, the width of the reinforcement layer 6 is equal to at least 20 mm. Preferably, such width is lower than 60 mm.

The tread band 7 is made with a cross-linkable elastomeric composition comprising a reinforcement system constituted by modified silicate fibres of nanometric size and fibrillated polymer fibres of micrometric size as previously described.

The tread band 7 is extended axially and in radially outer position with respect to the crown structure 2a and, if present, with respect to the reinforcement layer 6 for a width section which can be lower than or equal to that of the crown structure 2a or of the reinforcement layer 6.

The weight of the tyre 100 for racing bicycle wheels is lower than about 350 g, preferably lower than, or equal to, about 250 g.

The weight of the tyre 100 for city bicycle wheels is higher than about 250 g, preferably higher than, or equal to, about 350 g.

The weight of the tyre 100 for off-road bicycle wheels is higher than, or equal to, about 300 g, more preferably higher than, or equal to, about 350 g.

In a tyre intended for a wheel for off-road bicycle, the tread band 7 comprises a plurality of blocks.

The reinforcement layer 6 is made of elastomeric compound which can be reinforced with the reinforcement system as described for the tread band or typical reinforcement fillers like carbon black and/or silicates, known to the man skilled in the art.

Preferably, the building of the tyre 100 occurs according to processes known to the man skilled in the art.

FIGS. 2-7 illustrate different tyre structure schemes.

Figure 2:
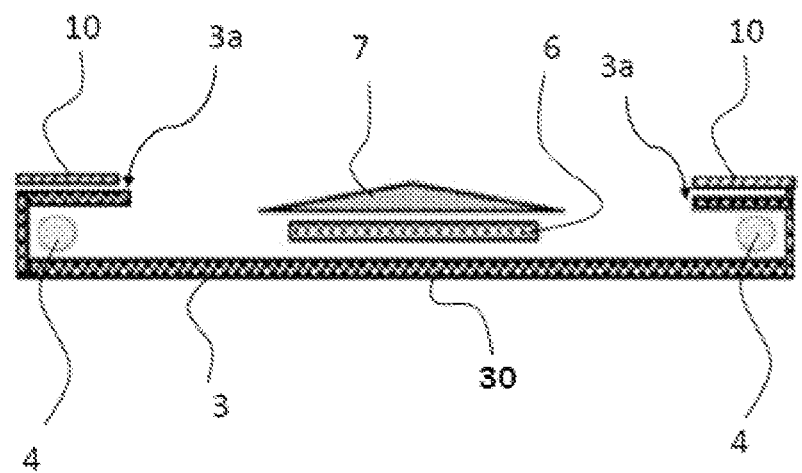
FIGS. 2-7 show possible schematic structural schemes representative of embodiments of tyres according to the invention.

In the structural scheme of FIG. 2, the end flaps 3a of the carcass ply 3 are axially spaced from each other and are situated in axial positions different from that of the reinforcement layer 6. In the specific example of FIG. 2, on the back-folded end flap 3a of the carcass ply 3, the reinforced belt-like element 10 is applied—which however does not have to be present.

Figure 3:
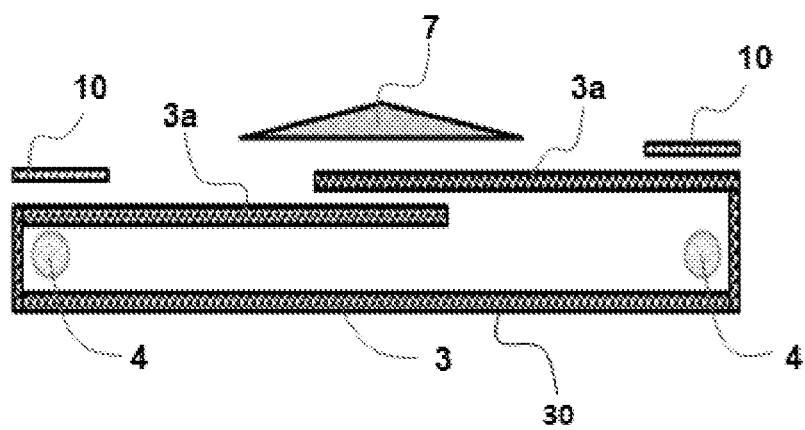
Figure 4:
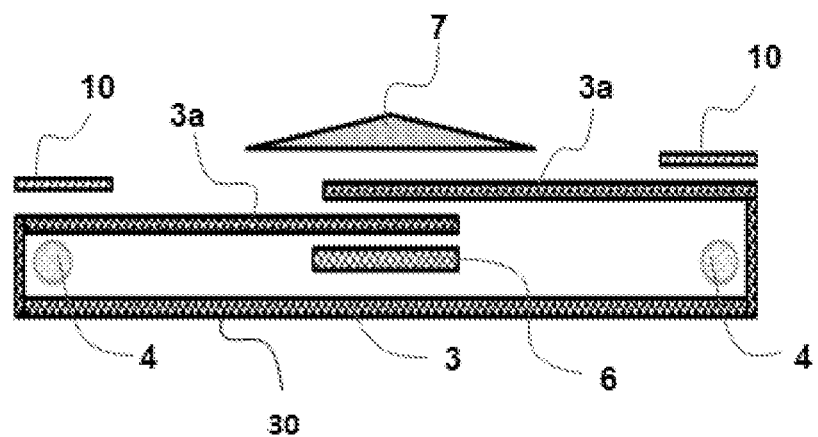
Figure 5:
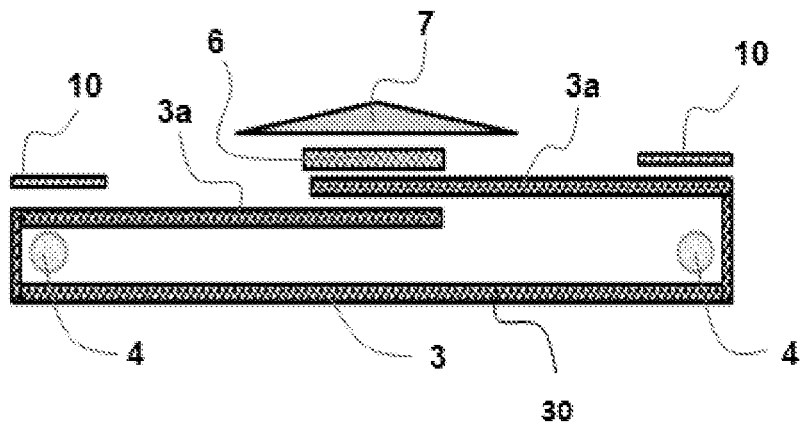

FIGS. 3-5 schematically show possible embodiments of a single-ply tyre in accordance with the present invention.

Such embodiments differ from that of FIG. 2 due to the fact that the end flaps 3a are partially superimposed on each other at the tread 7, and due to whether or not they comprise the reinforcement layer 6.

In the embodiments of FIGS. 2-5, in proximity to the beads 5 and on the back-folded end flap 3a of the carcass ply 3, the reinforced belt-like element 10 is applied—which however does not have to be present.

Figure 6:
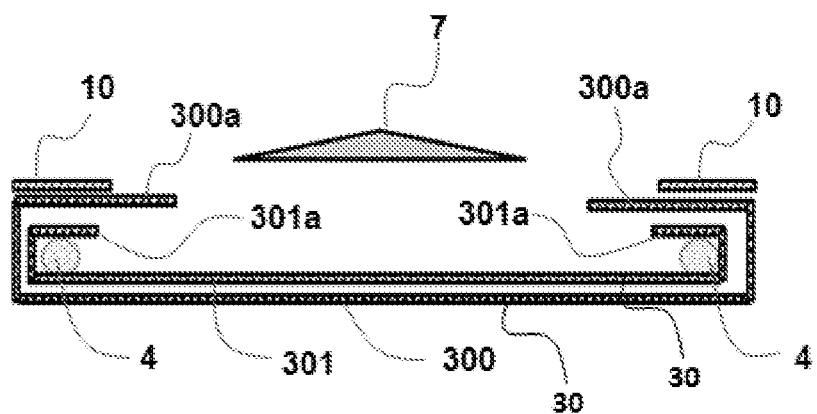
Figure 7:
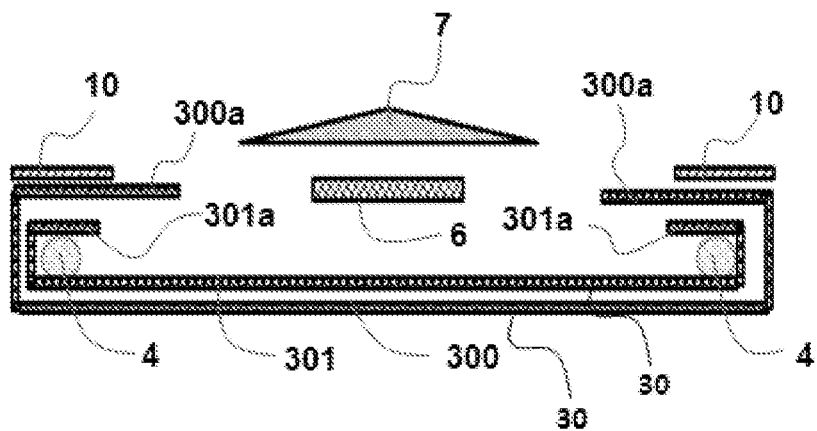

FIGS. 6 and 7 schematically show possible embodiments of a dual-ply tyre in accordance with the present invention.

In the embodiment of FIGS. 6 and 7, both the carcass plies 300, 301 have the respective opposite end flaps 300a, 301a back-folded around the bead cores 4, axially spaced from each other and in axial positions different from that of the tread 7.

The embodiments of FIGS. 6 and 7 differ from each other due to whether or not they comprise the reinforcement layer 6.

The present invention has been described with reference to several preferred embodiments. Various modifications can be made to the above-described embodiments, remaining however within the protective scope of the invention as defined by the following claims.

In an alternative embodiment (not illustrated), the tyre for bicycle wheels can comprise a carcass structure 2 of radial type with reinforcement elements arranged tilted with respect to the equatorial plane in proximity to the same equatorial plane, by an angle higher than 65°, preferably comprised between 70° and 90°, said tyre being provided with a structure or belt layer radially external with respect to the so-called zero degree carcass structure comprising reinforcement elements with substantially circumferential orientation, i.e. arranged with tilt lower than 30°, preferably lower than 20° with respect to the circumferential direction perpendicular to the rolling axis of the tyre.

In such structure, the belt layer is formed by helically winding, in axial direction and with preferably constant winding pitch, a single reinforcement cord on the crown portion 2a of the carcass structure 2 according to a winding direction oriented, with respect to the equatorial plane X-X, at an angle comprised between about 0° and about 30°, ends included.

The present invention will be further illustrated hereinbelow by means of a number of examples, which are merely provided for exemplifying purposes and without any limitation of this invention.

EXAMPLE 1—PREPARATION TEST

The elastomeric compositions for tread band NP (normal production), 1(c) and 2(c) (comparison) and 3(i) (invention), which comprise the different reinforcement fillers in the quantities indicated in table 1, were prepared as follows (the quantities of the various components are provided in phr).

All the components, except for sulfur, retardant and accelerant (CBS), were mixed together in an internal mixer (Pomini PL 1.6 model) for about 5 minutes (first step). As soon as the temperature has reached 145+5° C., the elastomeric composition was unloaded. The sulfur, the retardant and the accelerant (CBS) were then added and the mixing was executed in an open roller mixer (second step).

TABLE 1

|  | NP | 1(c) | 2(c) | 3(i) |
|---|---|---|---|---|
| Natural rubber | 50.00 | 50.00 | 50.00 | 50.00 |
| Synthetic rubber | 68.75 | 68.75 | 68.75 | 68.75 |
| Fibrillated polymer fibres | — | 3.00 | — | 3.00 |
| Modified silicate fibres | — | — | 15.00 | 15.00 |
| Silica | 50.00 | 50.00 | 35.00 | 35.00 |
| Hydrocarbon resin | 3.00 | 3.00 | 3.00 | 3.00 |
| Stearic acid | 2.00 | 2.00 | 2.00 | 2.00 |
| TESPT | 4.50 | 4.50 | 4.50 | 4.50 |
| Zinc oxide | 2.50 | 2.50 | 2.50 | 2.50 |
| Wax | 2.00 | 2.00 | 2.00 | 2.00 |
| 6PPD | 3.00 | 3.00 | 3.00 | 3.00 |
| TBBS | 2.50 | 2.50 | 2.50 | 2.50 |
| Sulfur | 1.20 | 1.20 | 1.20 | 1.20 |

Natural rubber: STR 20 P 93, SRI Trang Agroindustry;
Synthetic rubber: S-SBR - SLR 4630 Styron Sprintan ®polymer extended with 37.5 phr of oil for each 100 phr of dry elastomeric polymer (68.75 phr of S-SBR extended oil equals 50 phr of Styrene Butadiene elastomer)
Fibrillated polymer fibres: Kevlar ® Pulp, DuPont ®
Modified silicate fibres: Pangel S9 modified as described in example 9 of the Italian patent application No. 102016000108318 filed on 26 Oct. 2016;
Silica: precipitated synthetic amorphous silica Zeosil ® 1165 MP;
Hydrocarbon Resin: Novares ® TT30;
Stearic Acid: Sogis;
TESPT: bis[3-(triethoxysilyl)propyl]tetrasulfide;
Zinc Oxide: Zincol Ossidi;
Wax: Antilux ® 654 microcrystalline wax;
6PPD: N-(1,3-dimethylbutyl)-N'-phenyl-phenylene-diamine;
TBBS: N-tertbutyl-2-benzothiazyl sulfenamide (Vulkacit ® NZ);
Sulfur: Redball Superfine, International Sulphur Inc.

EXAMPLE 2—ANTI-PUNCTURE TEST

By using the compounds of table 1, rubber specimens were attained with dimensions 200×200×2 mm thickness; such specimens were vulcanised at 170° C. for 10 minutes, and subjected to a puncture test according to the standard DIN EN 14477, adapted in the test conditions, as expressed hereinbelow.

Such test allows evaluating the resistance to perforation of a material by subjecting it to the action of a penetrator (a needle with 0.8 mm diameter), which penetrates the specimen at constant speed. The test is carried out with the aid of a dynamometer capable of adjusting the applied force (measured in N at different penetration depths) and the elastic deformation of the material (measured in mm).

Said applied force is therefore indicative of the resistance of the material to the penetration of a foreign body (the material is more resistant the higher the value of the force); and said elastic deformation is an expression of the capacity of the material to absorb the penetration of a foreign body (the material is more elastic the higher the value of said deformation given the same force).

The tests were executed in climate-controlled environment at a controlled temperature of 23°±2° C. The specimens were climate-controlled for 48 hours before the test.

The following test conditions were used:

test speed=50 mm/minute;

initial distance between the tip of the penetrator and the specimen-holder=10 mm;

applied pre-load=0.5 N.

Tests were carried out on 5 specimens and the average values obtained are reported in the following Table 2.

TABLE 2

| Specimen | Force (N) @2 mm | Force (N) @3 mm |
|---|---|---|
| NP | 4.07 | 6.24 |
| 1(c) | 7.02 | 12.04 |
| 2(c) | 3.61 | 5.98 |
| 3(i) | 5.90 | 10.84 |

The data reported in Table 2 show for specimen 2(c) a behaviour that does not differ—if not for the worse—from that of the reference specimen NP. The puncture force values for specimen 2(c), both at 2 and at 3 mm, are in fact lower than those of the reference specimen NP. On the contrary, specimen 1(c) showed much higher puncture force values, indicative of a high resistance of the material to puncture.

Surprisingly, the specimen 3(i) of the present invention showed a behaviour very similar to that of specimen 1(c) even if the presence of modified silicate fibres would make one assume that a worsened behaviour would be encountered. Therefore, it can be assumed that small quantities of fibrillated micrometric polymeric fibres are sufficient for ensuring high anti-puncture performances.

Figure 8:
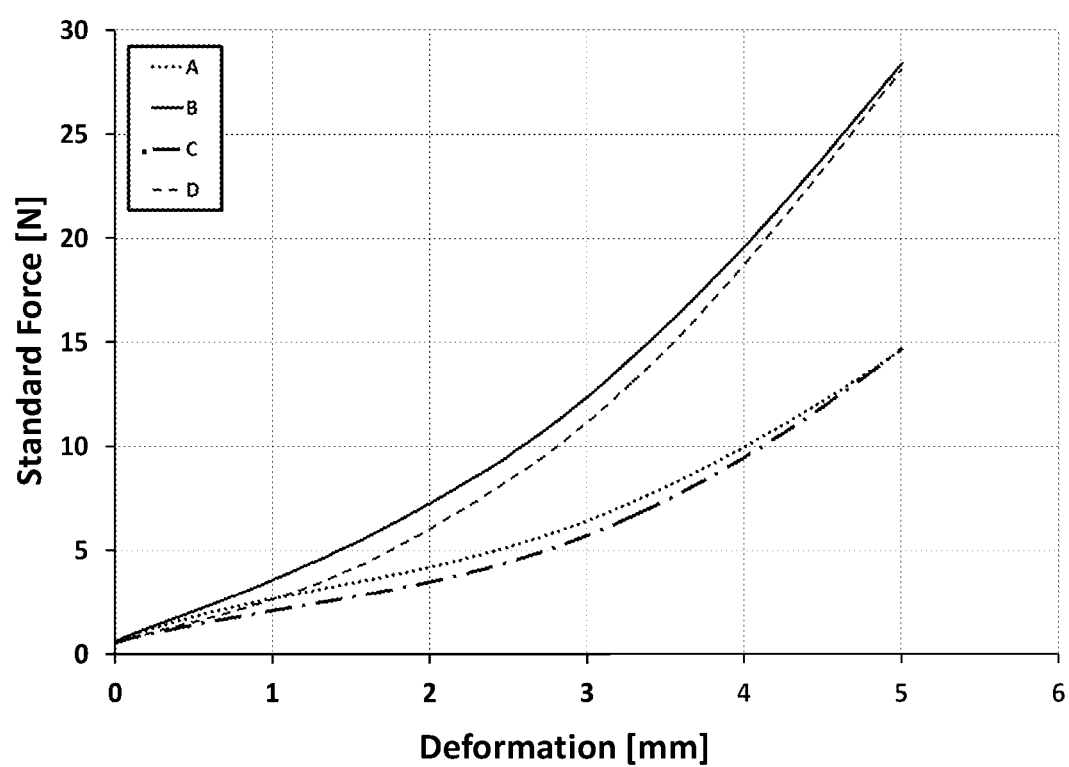
FIG. 8 illustrates the graph obtained as described in example 2, which reports the progression of the puncture force with the increase of the deformation of the material for the specimens of example 1.

The graph shown in FIG. 8 reports the progression of the puncture force with the increase of material deformation. The graph, in accordance with the data reported in Table 2, shows very close curves for the specimens NP (curve A) and 2(c) (curve C) and for specimens 1(c) (curve B) and 3(i) (curve D).

The obtained results demonstrate a greater resistance to perforation encountered in the specimens containing Kevlar® Pulp, 1(c) and 3(i), which undergo deformations decidedly lower than those of the specimens NP and 2(c), simultaneously requiring a greater puncture force in order to cause the same deformation.

EXAMPLE 3—STATIC AND DYNAMIC MECHANICAL PROPERTIES

The static mechanical properties (CR rupture load, AR elongation at break) according to the standard UNI 6065 were measured on the specimens of the elastomeric materials described in example 2.

The dynamic mechanical properties E' and Tan delta were measured, on the same specimens, by using a dynamic Instron model 1341 device in traction-compression mode according to the following methods. A test piece of cross-linked material (170° C. for 10 minutes)—having cylindrical shape (length=25 mm; diameter=14 mm), preloaded to compression up to a longitudinal deformation of 25% with respect to the initial length and maintained at the predetermined temperature (0° C., 23° C. or 40° C.) for the entire duration of the test—was subjected to a dynamic sinusoidal stress having an amplitude of ±3.5% with respect to the pre-load length, with a frequency of 100 Hz.

The dynamic mechanical properties are expressed in terms of values of dynamic elastic modulus (E') and Tan delta (loss factor). The Tan delta value was calculated as ratio between the viscous dynamic modulus (E") and the elastic dynamic modulus (E').

The Tan delta values at 0° C. are predictive of the behaviour of the tyre in wet road surface conditions, those at 23° C. of the behaviour in normal conditions on dry road surface, and those at 40° C. of the behaviour in extreme handling conditions (e.g. fast descents). The Tan delta value at ambient temperature is also able to provide indications with regard to the rolling resistance of the tyre.

The results obtained from the aforesaid determinations are reported in the following Table 3, with values referred to those obtained on the reference specimen NP, normalised to 100.

TABLE 3

|  | NP | 1(c) | 2(c) | 3(i) |
|---|---|---|---|---|
| STATIC MECHANICAL PROPERTIES | | | | |
| CR [MPa] | 100 | 116 | 100 | 102 |
| AR [%] | 100 | 128 | 91 | 111 |
| DYNAMIC MECHANICAL PROPERTIES | | | | |
| E' 0° C. [Mpa] | 100 | 103 | 100 | 98 |
| Tan Delta 0° C. | 100 | 94 | 89 | 87 |
| E' 23° C. [Mpa] | 100 | 102 | 102 | 100 |
| Tan Delta 23° C. | 100 | 100 | 84 | 84 |
| E' 40° C. [Mpa] | 100 | 103 | 100 | 103 |
| Tan Delta 40° C. | 100 | 104 | 82 | 85 |

The results relative to the static mechanical properties demonstrated a clearly greater resistance of the compound containing fibrillated polymer fibres (specimen 1(c)), with respect to that of normal production NP. The specimen 2(c), containing modified silicate fibres, instead showed increased fragility, even with respect to the specimen NP. Finally, the compound containing the reinforcement system of the present invention showed intermediate resistance, improved with respect to the compound of normal production.

The laboratory tests on the dynamic properties showed discouraging hysteresis values for specimen 1(c) containing Kevlar® Pulp. In fact, with respect to specimen NP, specimen 1(c) showed an increase of the Tan delta values at high temperatures and simultaneously a decrease of the values at 0° C. This suggests high rolling resistance and an overall worsening of the handling of tyres comprising a tread band containing compounds of type 1(c), which have also shown the highest anti-puncture performances among the tested specimens.

The hysteresis values obtained for specimen 2(c), containing modified sepiolite, were clearly lower than those of the specimen NP, at all the tested temperatures. Surprisingly, the hysteresis values obtained for specimen 3(i), containing the reinforcement system of the present invention, resulted very similar to those of specimen 2(c) notwithstanding the presence of fibrillated polymer fibres (Kevlar® Pulp) in the compound.

Although the values at 23° C. suggested for both specimens 2(c) and 3(i) an improved rolling resistance with respect to specimen NP, the Tan delta values at 0° C. for such specimens, and in particular for specimen 3(i), were predictive of an overall worsened handling for tyres comprising a tread band containing such compounds with respect to those of normal production, above all on wet surface.

EXAMPLE 4—HANDLING TEST

Even if the results of the tests on the dynamic mechanical properties predicted worsened handling for all the tested compounds with respect to those of normal production, the Applicant in any case decided to carry out handling tests on tyres comprising a tread band containing compounds of type 3(i). The material containing the reinforcement system of the present invention, constituted by modified silicate fibres and fibrillated polymer fibres, in fact showed improved anti-puncture and rolling resistance properties, with respect to that of normal production.

Racing tyres for bicycles were therefore prepared, with dimensions 622 mm×25c, according to the structure illustrated in FIG. 4 comprising a tread band of elastomeric material according to the compounds NP (reference) and 3(i) (invention) described in example 1.

The carcass structure provided for a rubber-covered carcass ply of 0.3 mm total thickness made of nylon 125 TPI—235 Dtex, equipped with a belt layer made of a square anti-puncture fabric (nylon 20 TPI weft/aramid 40 TPI 470 warp), aramid bead cores and two anti-abrasive square rubber-covered fabrics at the edges. The tyres provided with tread band containing compound NP and 3(i) had average weight of 223 g.

The racing tyres thus formed were mounted on a Cannondale Caad12 Disk racing bicycle and the riding tests were carried out in dry road surface conditions at an average temperature of 31° C., and wet road surface conditions at an average temperature of 14° C. The obtained results are reported in Tables 4 and 5, respectively.

For the purpose of evaluating the behaviour of the tyre, the tester simulated several characteristic manoeuvres and then evaluated the behaviour of the tyre, and assigned a score as a function of the performance of the tyre during said manoeuvre.

Tables 4 and 5 summarise the tester scores sheet for the controllability of the tyres. The results of these tests are expressed by means of an evaluation scale that represents the subjective opinion expressed by the tester, by means of a score system. The values reproduced in the following table represent an average value from among those obtained in several test session (5-6 tests, for example). The results are reported for comparison with those recorded for the tyres provided with tread band containing compound NP.

−−=definitely worsened; −=worsened; 0=equal; +=improved; ++=definitely improved.

TABLE 4

| TESTS IN DRY ROAD SURFACE CONDITIONS | |
| --- | --- |
| RIDING | |
| Straight stability | 0 |
| Curve stability | ++ |
| Precision | ++ |
| Contact sensation | ++ |
| Safety sensation | ++ |
| Controllability | ++ |
| Entering a curve while braking | ++ |
| Homogeneity/progressivity | + |
| Centring in a curve | + |
| Predictability at the limit (atl) | ++ |
| COMFORT | |
| Absorption/responsiveness on bumpy road | 0 |
| Handling recovery | + |
| PERFORMANCES | |
| Combined adherence | + |
| Average | + |

TABLE 5

| TESTS IN WET ROAD SURFACE CONDITIONS | |
| --- | --- |
| RIDING | |
| Heating | 0 |
| Draining | 0 |
| Contact sensation | + |
| Safety sensation | + |
| Controllability | + |
| Homogeneity/progressivity | 0 |
| COMFORT | |
| Absorption | 0 |
| PERFORMANCES | |
| Perceived chemical adherence | 0 |
| ADHERENCE | |
| Traction during braking | 0 |
| Traction during acceleration | 0 |
| Average | 0/+ |

Surprisingly, the tyres comprising a tread band containing the compound 3(i) of the present invention have shown improved handling in the tests on dry road surface, and comparable if not improved handling on wet road surface with respect to the tyres of normal production.

The invention claimed is:

1. A tyre for bicycle wheels comprising:
a carcass structure; and
a tread band arranged in radially outer position with respect to said carcass structure;
wherein said tread band is made by vulcanisation of cross-linkable elastomeric composition comprising a reinforcement system comprising modified silicate fibres of nanometric size and fibrillated polymer fibres of micrometric size, wherein said fibrillated polymer fibres are made of polymer material with a melting temperature of at least 170° C., and
wherein the tyre for bicycle wheels has a weight lower than, or equal to, 2 kg.

2. The tyre according to claim 1, wherein said modified silicate fibres have a diameter between 1 nm and 100 nm and a length lower than 10 um.

3. The tyre according to claim 1, wherein said modified silicate fibres show an aspect ratio between the length and the diameter of at least 2:1.

4. The tyre according to claim 1, wherein said modified silicate fibres are derived from silicate fibres selected from the group consisting of sepiolite fibres, palygorskite or attapulgite fibres, halloysite fibres, wollastonite fibres, organically modified thereof, and mixtures thereof.

5. The tyre according to claim 4, wherein said modified silicate fibres are derived from silicate fibres selected from the group consisting of sepiolite fibres, organically modified thereof, and mixtures thereof.

6. The tyre according to claim 5, wherein said modified silicate fibres comprise from 3.8% to 12% by weight of magnesium with respect to the weight of the fibres themselves.

7. The tyre according to claim 5, wherein said modified silicate fibres comprise amorphous silica deposited on the surface of the fibres themselves.

8. The tyre according to claim 1, wherein said fibrillated polymer fibres are selected from the group consisting of aramid fibres, polyester fibres, acrylic fibres, microfibrillated cellulose fibres, and plant fibres.

9. The tyre according to claim 1, wherein said fibrillated polymer fibres have a diameter between 5 um and 30 um and a length between about 0.05 mm and about 8 mm.

10. The tyre according to claim 1, wherein said fibrillated polymer fibres show an aspect ration between the length and the diameter higher than 30:1.

11. The tyre according to claim 1, wherein said fibrillated polymer fibres show a surface area ranging from about 0.5 m2/g to about 60 m2/g.

12. The tyre according to claim 1, wherein said cross-linkable elastomeric composition comprises:
   (a) 100 phr of at least one diene elastomeric polymer;
   (b) from 1 to 60 phr of said modified silicate fibres,
   (c) from 0.1 phr to 20 phr of said fibrillated polymer fibres, and
   (d) from 1 to 120 phr of a standard reinforcement filler.

13. The tyre according to claim 12, wherein said modified silicate fibres are present in said elastomeric composition in a quantity ranging from 3 phr to 40 phr.

14. The tyre according to claim 12, wherein said polymer fibres are present in said elastomeric composition in a quantity ranging from 0.5 phr to 10 phr.

15. The tyre according to claim 1, wherein said carcass structure comprises a carcass ply chosen from one carcass ply and multiple carcass plies.

16. The tyre according to claim 15, wherein said carcass ply comprises a plurality of reinforcement cords and the plurality of reinforcement cords are tilted, with respect to an equatorial plane of the tyre, by a first angle comprised between about 30° and about 60°, ends included.

17. The tyre according to claim 1, further comprising one or more reinforcement layers arranged in a radially inner position with respect to said tread band.

18. The tyre according to claim 17, wherein said one or more reinforcement layers are axially extended for a width section between 10% and 90% of the width of said tyre.

19. The tyre according to claim 1, wherein the carcass structure comprises a crown structure, and at the crown structure, a belt layer associated with and in radially outer position with respect to said carcass structure.

20. The tyre according to claim 1, wherein the carcass structure comprises a back-folded end flap of a carcass ply at each bead, and at each bead, a reinforced belt-like element associated with and in a radially outer position with respect to said carcass structure.

* * * * *